United States Patent
Hudman (10) Patent No.: US 10,778,963 B2
(45) Date of Patent: Sep. 15, 2020

(54) HEAD-MOUNTED DISPLAY (HMD) WITH SPATIALLY-VARYING RETARDER OPTICS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 55 days.

(21) Appl. No.: 16/101,333

(22) Filed: Aug. 10, 2018

(65) Prior Publication Data

US 2020/0053350 A1   Feb. 13, 2020

(51) Int. Cl.
| | | |
|---|---|---|
| *H04N 13/332* | (2018.01) | |
| *G02F 1/1334* | (2006.01) | |
| *G02B 27/09* | (2006.01) | |
| *G02B 27/01* | (2006.01) | |
| *G02B 5/30* | (2006.01) | |
| *G02B 27/14* | (2006.01) | |

(52) U.S. Cl.
CPC ......... *H04N 13/332* (2018.05); *G02B 5/3025* (2013.01); *G02B 5/3083* (2013.01); *G02B 27/0172* (2013.01); *G02B 27/0955* (2013.01); *G02B 27/14* (2013.01); *G02F 1/1334* (2013.01)

(58) Field of Classification Search
CPC .................................................. H04N 13/332
See application file for complete search history.

(56) References Cited

U.S. PATENT DOCUMENTS

| | | |
|---|---|---|
| 5,966,242 A | 10/1999 | Yamanaka |
| 2004/0184019 A1* | 9/2004 | Totzeck ............... G02B 5/1809 355/71 |
| 2010/0002154 A1 | 1/2010 | Hua |
| 2012/0154920 A1 | 6/2012 | Harrison et al. |
| 2015/0235431 A1 | 8/2015 | Schowengerdt |
| 2016/0231566 A1 | 8/2016 | Levola et al. |
| 2017/0255015 A1* | 9/2017 | Geng .................. G02B 6/0008 |
| 2017/0293147 A1 | 10/2017 | Tremblay et al. |
| 2017/0336641 A1 | 11/2017 | von und zu Liechtenstein |
| 2020/0053350 A1 | 2/2020 | Hudman |

FOREIGN PATENT DOCUMENTS

WO   WO2017213911 A1   12/2017

OTHER PUBLICATIONS

PCT Search Report and Written Opinion dated Nov. 13, 2019 for PCT application No. PCT/US19/45988, 8 pages.

* cited by examiner

*Primary Examiner* — Gustavo Polo
(74) *Attorney, Agent, or Firm* — Lee & Hayes, P.C.

(57) ABSTRACT

A head-mounted display, or other near-to-eye display, incorporates optics that include a spatially-varying retarder (SVR). The SVR may include one or more layers of birefringent material. Light that enters and exits the SVR experiences a change in polarization where the phase of the light is modified by amounts that are different for different portions of the SVR. Focal length of light of an image generated by a pixelated display device is shortened by the optics so that the image can be focused onto a user's eye, which is relatively close to the pixelated display device.

20 Claims, 5 Drawing Sheets

HEAD-MOUNTED DISPLAY (HMD) WITH SPATIALLY-VARYING RETARDER OPTICS

BACKGROUND

Near-eye display technology may be used to present information and images to a user as part of a virtual reality ("VR") or augmented reality ("AR") system. Such a near-eye display may be incorporated into a head-mounted display ("HMD") device or headset. While these near-eye information displays can be oriented as direct-view, often the information displays are coupled with one or more lenses in the HMD. Lens systems may comprise lenses, various optical elements, aperture stops, and a lens housing to contain the various components in optical alignment with one another. Such lenses can enhance the VR or AR experience, but performance of lens systems depends, in part, on the design of each of the elements of the system as well as the overall design of the system, which sets forth the optical interaction among the elements.

Traditional information displays, such as liquid crystal displays, typically emit light over a broad angular cone or field of view. The angular divergence of these traditional displays can range beyond 160 degrees and even approach 180 degrees. When directly viewed, this angularly broad light may not cause undesirable effects. However, when traditional information displays are employed in an HMD, such as in a VR or AR system, the angularly broad emissions can lead to undesirable results. This is the case when the light emitted by the information display strikes the lenses of the HMD at incoming angles of incidence that are beyond the imaging capability of the lenses. Such light is not properly imaged to the user's eye(s) at least partly due to the fact that off-axis light exhibits polarization that is somewhat elliptical. That is, on-axis light is linearly polarized, while off-axis light exhibits some degree of elliptical polarization. Thus, light at angles beyond the focusing capability of the HMD's lens(es) can result in undesirable visual effects like flood illumination, ghosting, glare, scatter, and other stray light effects. This stray non-imaged light can result in the user of the VR or AR headset experiencing undesirable visual artifacts.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

In various examples described herein, techniques and architectures may be used to produce an image focused onto an eye (one or both) of a user of a wearable device. Examples of a wearable device may include a display device worn on a user's head or as part of a helmet, such as a head-mounted display ("HMD") device or headset, and may include position and/or motion sensors to measure inertial position or orientation of the wearable device. The display device may comprise a display in front of one eye, each eye, or both eyes. The display devices may include liquid crystal displays (LCDs), organic light-emitting diode (OLED), liquid crystal on silicon (LCOS), or cathode ray tubes (CRTs), just to name a few examples. A wearable device may display a computer-generated image, referred to as a virtual image. For example, a processor of the wearable device may render and display a synthetic (virtual) scene so that the viewer (wearer of the wearable device) perceives the scene as reality (or augmented reality), as described below.

In some examples, an LCD display device comprises several components. Two of the components are the display matrix, which obstructs light in a granular or pixelated fashion to create an image, and a light source or backlight. The light source is typically positioned behind the display matrix and illuminates the image. For a color display, the backlight typically emits broad spectrum light, such as white light, for example.

Near-eye display technology may be used to present information and images to a user as part of a virtual reality ("VR") or augmented reality ("AR") system, which may be in the form of a wearable device, such as that introduced above. VR or AR HMDs may use one or more lenses to direct light associated with images displayed on one or more information displays (e.g., a pixelated LCD display device) to the user's eye(s). Among other things, lenses are used to bend light from the information display(s) so as to make the information display appear to the user to be farther away than it actually is. This provides the user a greater depth of field in the virtual environment and allows the user to more easily focus on the displayed image. Lenses also can be used in VR or AR headsets to increase the field of view of the information display for the user. A larger field of view can increase the immersive effect of the VR or AR system. Lenses can further be used in VR or AR headsets to shape the light from a single display so that the light received by the user is tailored separately for the user's left and right eyes. Use of separately tailored images for each eye can cause the user to perceive a stereoscopic or three-dimensional image, for example. Lenses are further designed in the near-eye environment with a constraint that the user's eyes are relatively close to the information display.

In various examples, an optical system of a wearable device incorporates a spatially-varying retarder (SVR). The system, which also includes an information display, among other things, allows for near-to-eye applications that involve focusing images onto a user's eye that is relatively close to the information display. The SVR is used to modify the phase of light—of the image produced by the information display—by amounts that are different for different portions of the SVR. Accordingly, the SVR provides appropriate levels of retardation for varying angles of incidence, which mitigates undesirable visual effects like flood illumination, ghosting, glare, scatter, and other stray light effects that are present in conventional optical system designs. Such phase modification by the SVR works in concert with various optical elements in the optical system, as described below.

Those of ordinary skill in the art will realize that the following description is illustrative only and not in any way limiting. Other embodiments will readily suggest themselves to such skilled persons, having the benefit of this disclosure. Reference will now be made in detail to specific implementations as illustrated in the accompanying drawings. The same reference numbers will be used throughout the drawings and the following description to refer to the same or like parts.

Figure 1:
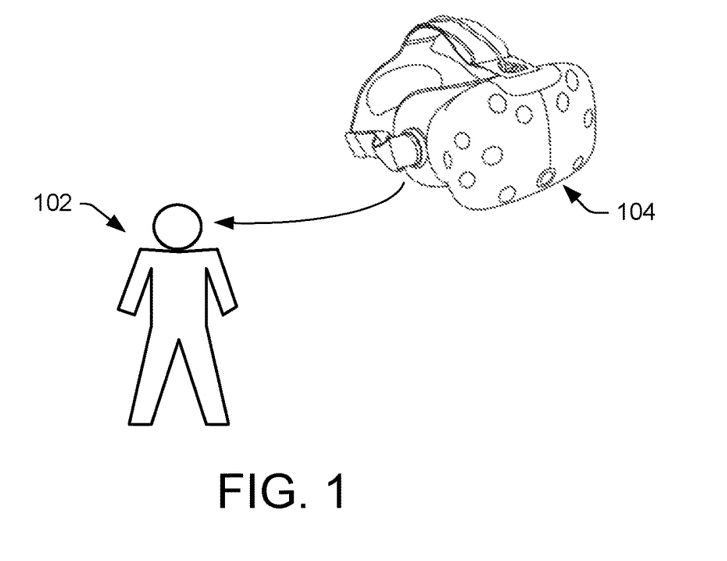
FIG. 1 is a schematic diagram depicting a user and a wearable device in which techniques and configurations described herein may be implemented.

FIG. 1 is a schematic diagram depicting a user 102 and a wearable device 104, according to some embodiments. A computing device associated with the wearable device 104 may provide rendering data associated with individual virtual content items to wearable device 104 and cause the individual virtual content items to be presented on a display associated with the wearable device 104. Rendering data may include instructions for rendering a graphical representation of a virtual content item via a display of the device. For example, the rendering data may include instructions describing the geometry, viewpoint, texture, lighting, shading, etc. associated with a virtual content item. In an illustrative example, the virtual content items may be presented on the display of the wearable device 104 as part of a game that the user 102 can play using the wearable device 104.

In some examples, the computing device may be located remotely from wearable device 104 in a network, such as the Internet. In other embodiments, the computing device may be collocated with the wearable device 104 (e.g., embedded in the wearable device 104). Moreover, wearable device 104 may be communicatively coupled to a network in any manner, such as by a global or local wired or wireless connection (e.g., local area network (LAN), intranet, Bluetooth, etc.). The network(s) may facilitate communication between the computing device(s) and the wearable device(s) 104 associated with one or more users, such as the user 102.

Figure 2:
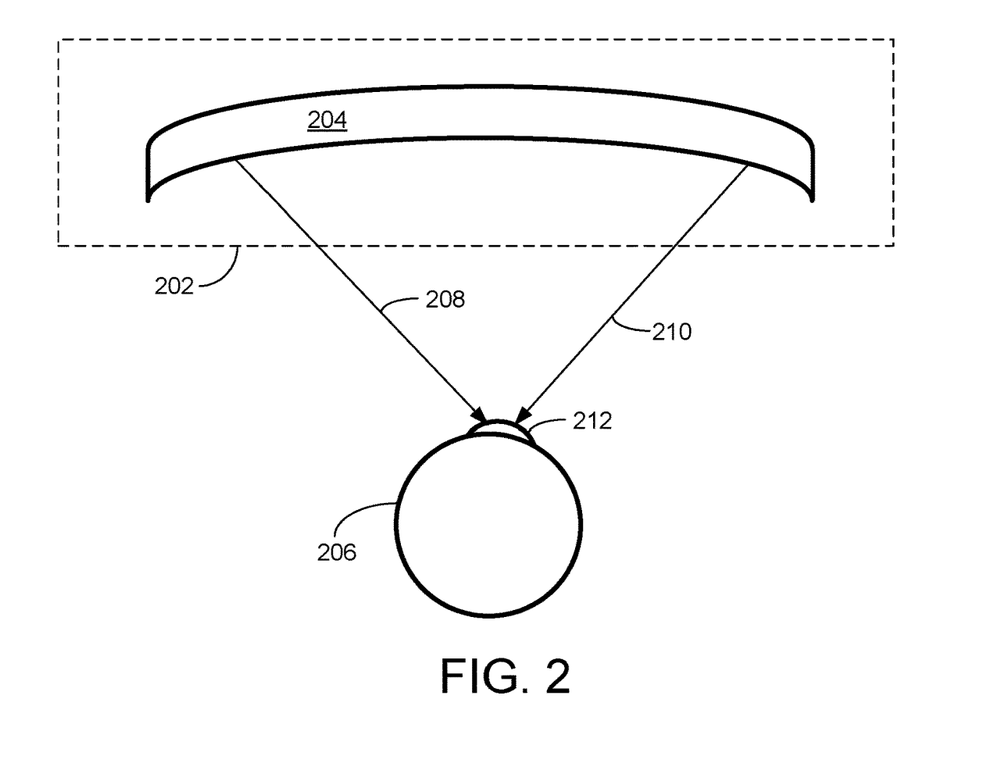
FIG. 2 is a schematic cross-section diagram of a portion of an example wearable device positioned relative to a user's eye.

FIG. 2 is a schematic cross-section diagram of a portion 202 of a wearable device 204 positioned relative to a user's eye 206. For example, wearable device 204 may be the same as or similar to wearable device 104. In certain embodiments, wearable device 204 may be configured to display an image to be seen by both the left and right eyes of the user. This can be achieved using separate left and right LCD displays, or can be achieved using a single LCD display. Similarly, the wearable device 204 (e.g., in the form of a VR or AR headset) could comprise a single lens assembly or it could use individual left and right lens assemblies.

Example light rays 208 and 210 illustrate possible paths of light from wearable device 204 to the cornea 212 of eye 206. The cornea 212 may be treated as having a substantially spherical shape. Wearable device 204 may include a near-to-eye display so that paths of light rays 208 and 210 are relatively short, such as to provide an eye relief of about 20 millimeters, for example. In this case, optics of the wearable device 204 are configured to focus light onto a surface (e.g., cornea 212) that is relatively close to the wearable device. Such a configuration may involve a pancake optical system that has a relatively thin profile that enables the pancake optical system to fit into wearable device 204 while allowing for a physical clearance from the user's eye 206.

Figure 3:
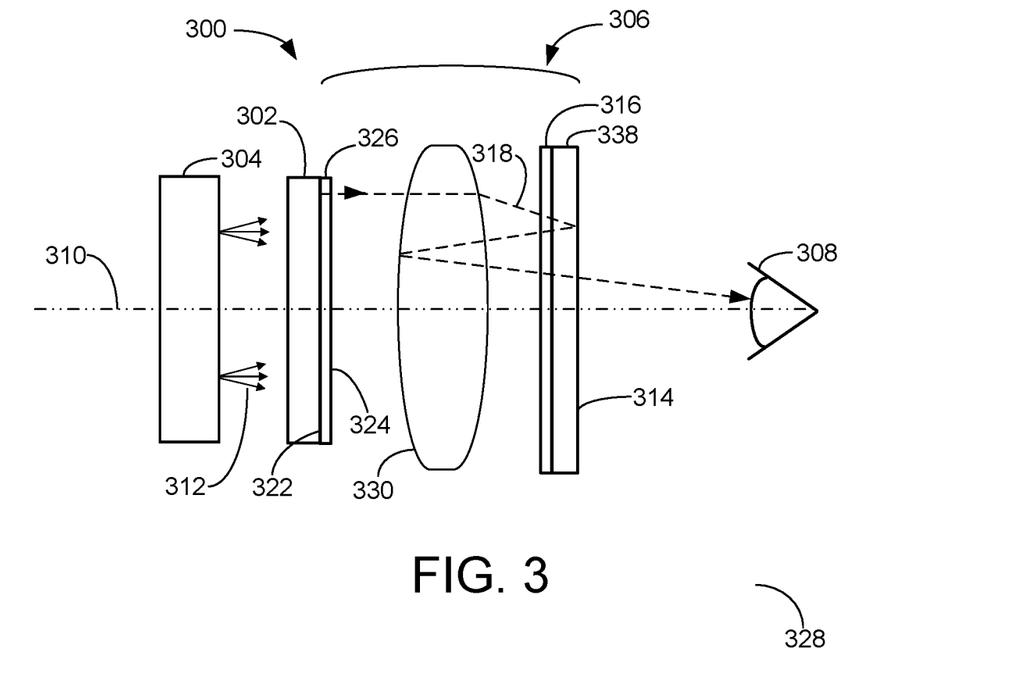
FIG. 3 is a schematic cross-section diagram of a system that includes a display and optical subsystem including a spatially-varying retarder (SVR), according to some embodiments.

FIG. 3 is a schematic cross-section diagram of a system 300 that includes a display and optical subsystem including a spatially-varying retarder (SVR), according to some embodiments. System 300 may be incorporated in a head-mountable device, such as wearable device 104/204, for example. However, it is to be appreciated that the system 300 may be incorporated in other types of devices including, without limitation, cameras, binoculars, office equipment, scientific instruments, and the like. The system 300 may include a pixelated display device 302, sometimes called an information display 302, backlight assembly 304, and an optical subsystem 306. A schematic representation of an eye 308 of a user is also illustrated. Such elements are aligned along an optical axis 310.

Backlight assembly 304, which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly 304 may emit light across a broad spectrum (e.g., white light) so that information display 302 can produce color images across the visible spectrum. Backlight assembly 304 may emit light uniformly across its entire front face over a range of about 160 to 180 degrees, for example.

Information display 302, in coordination with the backlight assembly 304, may emit light over a range of angles up to about 180 degrees (light that is just shy of parallel to the face of the backlight assembly 304). This range of emission angles is sometimes referred to as the backlight assembly's 304 field of view or the backlight assembly's 304 cone of light. In some embodiments, information display 302 may be an LCD matrix that includes one or more polarizing layers, a liquid crystal layer, and a thin film transistor layer. The LCD matrix creates images by obscuring portions of the backlight in a pixelated fashion. An image is displayed when light 312 is emitted from backlight assembly 304 and passes through information display 302 (e.g., an LCD matrix). For clarity, FIG. 3 shows separation between the backlight assembly 304 and information display 302. However, these two components may be sandwiched together with little, if any, space between them.

Optical subsystem 306 may comprise a lens assembly to direct light from information display 302 toward user's eye 308. Optical subsystem 306 may have a pancake configuration, for example. In this case, the optical subsystem 306 may comprise an assembly of optical elements configured to direct light from information display 302 toward user's eye 308 using on-axis optical folding based, at least in part, on polarization of the light, as described below. In some embodiments, the lens assembly of the optical subsystem 306 includes various optical elements other than a lens. For example, optical subsystem 306 may include at least one polarizing beam splitter 338 and a spatially-varying retarder (SVR) 316. The polarizing beam splitter 338 may be located between the SVR 316 and an exit surface (or side) 314 of the optical subsystem 306. The SVR 316 is configured to modify the phase of the light passing through the SVR 316 by amounts that are different for different portions of the SVR 316. For example, light emitted from the periphery of the display toward the user's eye may enter the optical subsystem 306 at a relatively large angle of incidence. SVR 316, if configured for varying degrees of phase modification across the SVR 316, may provide appropriate levels of retardation for light from any and all angles in order to mitigate undesirable visual effects (e.g., remove unwanted stray light from reaching the user's eye 308).

The polarizing beam splitter 338 may represent a beam splitter that only lets linearly polarized light pass through it, thereby reflecting all other light that is not linearly polarized. The polarizing beam splitter 338 may be considered a linear polarizer reflector, or a reflective linear polarizer. That is, the polarizing beam splitter 338 may combine the functionality of a linear polarizer and a beam splitter into a single element.

In some embodiments, the polarizing beam splitter 338 may be replaced with a partially reflective mirror (e.g., a 50/50 mirror). That is, the optical subsystem 306, according to some embodiments, may include at least one partially reflective mirror that is located between the SVR 316 and the exit surface (or side) 314 of the optical subsystem 306 (e.g., the partially reflective mirror may be in the position of reference numeral 338 in FIG. 3).

FIG. 3 illustrates an example ray path 318 of light of an image generated by information display 302. For simplicity, optical subsystem 306 is illustrated schematically as including at least one lens-shaped element. However, optical subsystem 306 may include any of a number of types of optical elements that need not be lenses. A particular example of an optical subsystem 306 is now described.

Optical subsystem 306 may include a first quarter-wave plate 326 having a front face 322 and a back face 324. The front face 322 may be considered the entrance side of the optical subsystem 306 (e.g., a lens assembly) where the light enters the optical subsystem 306. The front face 322 of the first quarter-wave plate 326 may be disposed on the information display 302. "Disposed on," as used herein, can mean "in contact with" or "adjacent to" such that there may be a space between a layer that is disposed on another layer. Accordingly, the first quarter-wave plate 326 may be in contact with the information display 302, or spaced a distance from the information display 302, yet interposed between the information display and a lens 330. It is also to be appreciated that "disposed on" may mean disposed directly on, or disposed indirectly on (e.g., with one or more intermediary layers). The lens 330 may be interposed between the first quarter-wave plate 326 and the SVR 316. The SVR 316 may be disposed on the polarizing beam splitter 338 (or, in the alternative, the SVR 316 may be disposed on a partially reflective mirror that is in the position of reference numeral 338 in FIG. 3).

In an example, the SVR 316 may be part of a second quarter-wave plate. In this manner, the second quarter-wave plate (interposed between the lens 330 and the polarizing beam splitter 338 (or the partially reflective mirror)) can include material, features, or another suitable mechanism to modify the phase of the light passing through the SVR 316 by amounts that are different for different portions of the SVR 316. Although the SVR 316 is shown and described in FIG. 3 as being interposed between the lens 330 and the polarizing beam splitter 338 (or the partially reflective mirror), it is to be appreciated that, alternatively, the SVR 316 can, instead, be part of the first quarter-wave plate 326. In this alternative embodiment, the SVR 316 shown in FIG. 3 can be replaced with a standard quarter-wave plate (i.e., a quarter-wave plate without a SVR). That is, the optical subsystem 306 may include two quarter-wave plates (one in the position of 326 and one in the position of 316), wherein the SVR may be part of either of the two quarter-wave plates. In some embodiments, the SVR can be part of both quarter-wave plates when the optical subsystem 306 includes two quarter-wave plates (one in the position of 326 and one in the position of 316).

To illustrate operating principles of optical subsystem 306, ray path 318 enters the first quarter-wave plate 326 polarized (e.g., linearly polarized to one orientation, p) at the front face 322 of the first quarter-wave plate 326. The light exiting the back face 324 of the first quarter-wave plate 326 may be circularly polarized. This light passes through the lens 330. The light emerging from the lens 330 then passes through the SVR 316, and is reflected from the polarizing beam splitter 338 (or, in the alternative, the light that passes through the SVR 316 is reflected from a partially reflective mirror in the position of reference numeral 338 in FIG. 3). This reflected light passes through the SVR 316 in the reverse direction, causing the light to change its handedness while remaining circularly polarized and oriented at 45 degrees. The light that passed through the SVR 316 in the reverse direction is again reflected by the lens 330 to cause the light to pass through the SVR 316 for a third time in the forward direction (i.e., towards the user's eye 308). This reflected light passes through the polarizing beam splitter 338 (or, in the alternative, the light passes through the partially reflective mirror in the position of reference numeral 338 in FIG. 3) to emerge from an exit side 314 (or surface) of the optical subsystem 306.

The SVR 316 modifies the phase of the light passing through the SVR 316 at an appropriate level of retardation as a function of the position on the SVR 316 where the incoming light is incident on the SVR 316. In this manner, the light emerging from the SVR 316 is horizontally polarized. Because the polarizing beam splitter 338 allows horizontally polarized light to pass through to the user's eye 308, and otherwise blocks vertically polarized light, the SVR 316 makes a late-stage phase modification to allow for the light to pass through the polarizing beam splitter 338. In the example of FIG. 3, because the example ray path 318 is off-axis, the ray path 318 entering the SVR 316 is elliptically polarized, and the position on the SVR 316 where the ray path 318 is incident on the SVR 316 includes material (e.g., birefringent material) and/or a feature(s) that modifies the phase of the light by an appropriate amount to cause the incoming elliptically polarized light to emerge as horizontally polarized light. This can be contrasted by an on-axis ray path (not shown) that is incident on the optical subsystem 306 at an angle of incidence equal to zero. Such an on-axis ray path would not have its polarization state altered by the SVR 316 because the amount of by which the phase is modified varies across the area of the SVR 316, with little-to-no phase modification at the center of the SVR 316. However, for incident light that is farther off-axis, the SVR 316 is configured to modify the phase of that off-axis incoming light at an appropriate amount as a function of the angle of incidence, and hence, the position on the SVR 316. Although the example describes that the polarizing beam splitter 338 allows horizontally polarized light to pass through to the user's eye 308, and otherwise reflects all other light that is not horizontally polarized light, it is to be appreciated that the polarizing beam splitter 338 may allow vertically polarized light to pass through to the user's eye 308, and otherwise reflect all other light that is not vertically polarized.

Figure 4:
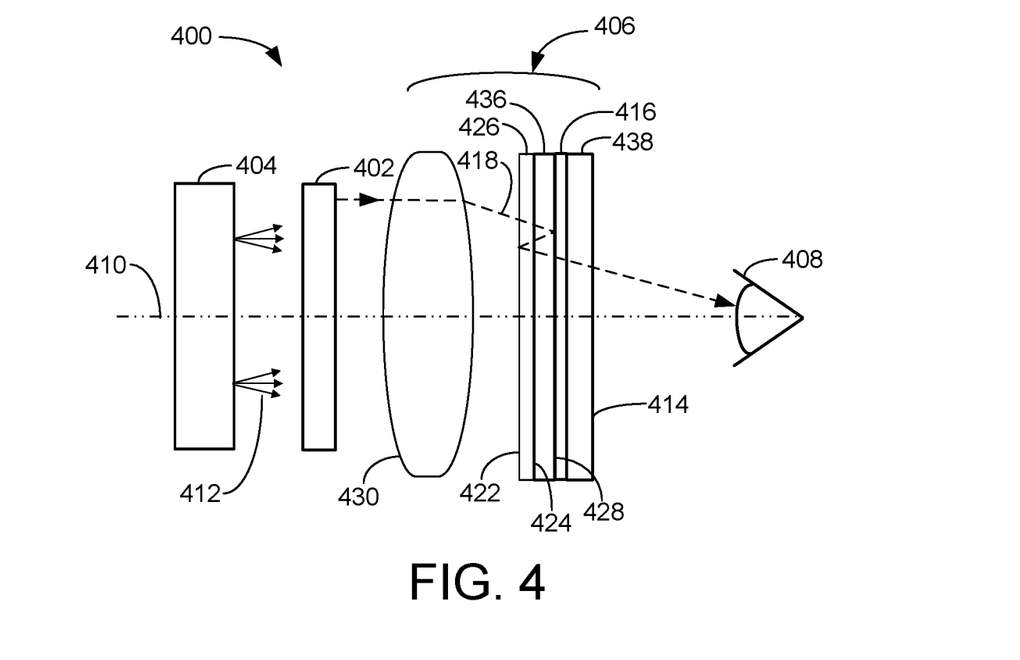
FIG. 4 is a schematic cross-section diagram of a system that includes a display and optical subsystem including a spatially-varying retarder (SVR), according to some embodiments.

FIG. 4 is a schematic cross-section diagram of a system 400 that includes a display and optical subsystem including a spatially-varying retarder (SVR), according to some embodiments. System 400 may be incorporated in a head-mountable device, such as wearable device 104/204, for example. However, it is to be appreciated that the system 400 may be incorporated in other types of devices including, without limitation, cameras, binoculars, office equipment, scientific instruments, and the like. The system 400 may include a pixelated display device 402, sometimes called an information display 402, backlight assembly 404, and an optical subsystem 406. A schematic representation of an eye 408 of a user is also illustrated. Such elements are aligned along an optical axis 410.

Backlight assembly 404, which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly 404 may emit light across a broad spectrum (e.g., white light) so that information display 402 can produce color images across the visible spectrum. Backlight assembly 404 may emit light uniformly across its entire front face over a range of about 160 to 180 degrees, for example.

Information display 402, in coordination with the backlight assembly 404, may emit light over a range of angles up to about 180 degrees (light that is just shy of parallel to the face of the backlight assembly 404). This range of emission angles is sometimes referred to as the backlight assembly's 404 field of view or the backlight assembly's 404 cone of light. In some embodiments, information display 402 may be an LCD matrix that includes one or more polarizing layers, a liquid crystal layer, and a thin film transistor layer. The LCD matrix creates images by obscuring portions of the backlight in a pixelated fashion. An image is displayed when light 412 is emitted from backlight assembly 404 and passes through information display 402 (e.g., an LCD matrix). For clarity, FIG. 4 shows separation between the backlight assembly 404 and information display 402. However, these two components may be sandwiched together with little, if any, space between them.

Optical subsystem 406 may comprise a lens assembly to direct light from information display 402 toward user's eye 408. Optical subsystem 406 may have a pancake configuration, for example. In this case, the optical subsystem 406 may comprise an assembly of optical elements configured to direct light from information display 402 toward user's eye 408 using on-axis optical folding based, at least in part, on polarization of the light, as described below. In some embodiments, the lens assembly of the optical subsystem 406 includes various optical elements other than a lens. For example, optical subsystem 406 may include at least one linear polarizer 438 and a spatially-varying retarder (SVR) 416. The linear polarizer 438 may be located between the SVR 416 and an exit surface 414 of the optical subsystem 406. The SVR 416 is configured to modify the phase of the light passing through the SVR 416 by amounts that are different for different portions of the SVR 416. For example, light emitted from the periphery of the display toward the user's eye may enter the optical subsystem 406 at a relatively large angle of incidence. SVR 416, if configured for varying degrees of phase modification across the SVR 416, may provide appropriate levels of retardation for light from any and all angles in order to mitigate undesirable visual effects (e.g., remove unwanted stray light from reaching the user's eye 408).

FIG. 4 illustrates an example ray path 418 of light of an image generated by information display 402. For simplicity, optical subsystem 406 is illustrated schematically as including at least one lens-shaped element. However, optical subsystem 406 may include any of a number of types of optical elements that need not be lenses. A particular example of an optical subsystem 406 is now described.

Optical subsystem 406 may include a reflective and refractive element 430 (sometimes referred to as "element 430"). The reflective and refractive element 430 may include a 50/50 mirror that allows about 50 percent of incoming light to pass through the element 430, while about 50 percent of the incoming light is reflected away by element 430. The optical subsystem 406 may further include a first quarter-wave plate 426 having a front face 422 and a back face 424. The first quarter-wave plate 426 may be disposed on a beam splitter 436 that has a front face adjacent to back face 424 of first quarter-wave plate 426, and a back face 428. The beam splitter 436 may be disposed on a SVR 416. The SVR 416 may be disposed on a linear polarizer 438. It is to be appreciated that "disposed on" may mean disposed directly on, or disposed indirectly on (e.g., with one or more intermediary layers). In addition, it is to be appreciated that "disposed on" can mean "in contact with" or "adjacent to" such that there may be a space between a layer that is disposed on another layer.

In an example, the SVR 416 may be part of a second quarter-wave plate. In this manner, the second quarter-wave plate (interposed between the beam splitter 436 and the linear polarizer 438) can include material, features, or another suitable mechanism to modify the phase of the light passing through the SVR 416 by amounts that are different for different portions of the SVR 416. Although the SVR 416 is shown and described in FIG. 4 as being interposed between the beam splitter 436 and the linear polarizer 438, it is to be appreciated that, alternatively, the SVR 416 can, instead, be part of the first quarter-wave plate 426. In this alternative embodiment, the SVR 416 shown in FIG. 4 can be replaced with a standard quarter-wave plate. That is, the optical subsystem 406 may include two quarter-wave plates (one in the position of 426 and one in the position of 416), wherein the SVR may be part of either of the two quarter-wave plates. In some embodiments, the SVR can be part of both quarter-wave plates when the optical subsystem 406 includes two quarter-wave plates (one in the position of 426 and one in the position of 416).

To illustrate operating principles of optical subsystem 406, ray path 418 enters the optical subsystem 406 polarized (e.g., linearly polarized to one orientation, p) at an entrance side (or surface) of the optical subsystem 406 (e.g., at the entrance side of element 430). Some of the light passes through the reflective and refractive element 430, while a remainder of the light is reflected away by the element 430. The ray path 418 emerging from the exit side of element 430 represents the portion of the light that passes through the element 430. The light emerging from the element 430 then passes through the first quarter-wave plate 426 and becomes circularly polarized. This circularly polarized light reflects from the beam splitter 436 and passes through the first quarter-wave plate 426 in the reverse direction, causing the light to change its handedness while remaining circularly polarized and oriented at 45 degrees. In some embodiments, the beam splitter 436 includes another 50/50 mirror. The light that passed through the first quarter-wave plate 426 in the reverse direction is again reflected to cause the light to pass through the first quarter-wave plate 426 for a third time in the forward direction (i.e., towards the user's eye 408). This reflected light passes through the beam splitter 436, then through the SVR 416 (e.g., a second quarter-wave plate that includes the SVR 416), and then through linear polarizer 438 to emerge from an exit side 414 (or surface) of the optical subsystem 406.

The SVR 416 modifies the phase of the light passing through the SVR 416 at an appropriate level of retardation as a function of the position on the SVR 416 where the incoming light is incident on the SVR 416. In this manner, the light emerging from the SVR 416 is horizontally polarized. Because the linear polarizer 438 allows horizontally polarized light to pass through to the user's eye 408, and otherwise blocks vertically polarized light, the SVR 416 makes a late-stage phase modification to allow for the light to pass through the linear polarizer 438. In the example of FIG. 4, because the example ray path 418 is off-axis, the ray path 418 entering the SVR 416 is elliptically polarized, and the position on the SVR 416 where the ray path 418 is incident on the SVR 416 includes material (e.g., birefringent material) and/or a feature(s) that modifies the phase of the light by an appropriate amount to cause the incoming elliptically polarized light to emerge as horizontally polarized light. This can be contrasted by an on-axis ray path (not shown) that is incident on the optical subsystem 406 at an angle of incidence equal to zero. Such an on-axis ray path would not have its polarization state altered by the SVR 416 because the amount of by which the phase is modified varies across the area of the SVR 416, with little-to-no phase modification at the center of the SVR 416. However, for incident light that is farther off-axis, the SVR 416 is configured to modify the phase of that off-axis incoming light at an appropriate amount as a function of the angle of incidence, and hence, the position on the SVR 416.

Figure 5:
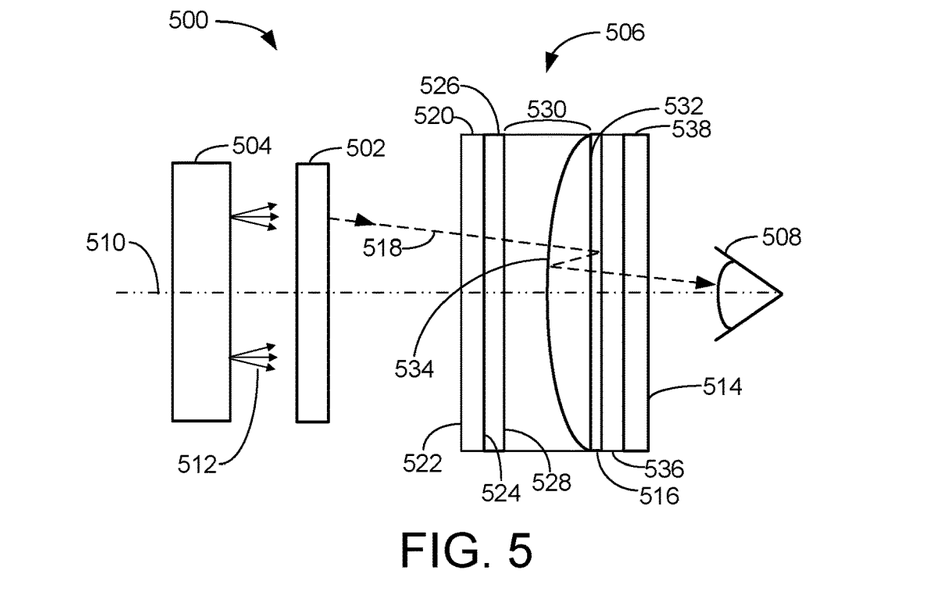
FIG. 5 is a schematic cross-section diagram of a system that includes a display and optical subsystem including a spatially-varying retarder (SVR), according to some embodiments.

FIG. 5 is a schematic cross-section diagram of a system 500 that includes a display and optical subsystem, according to some embodiments. System 500 may be incorporated in a head-mountable device, such as wearable device 104/204, for example. However, it is to be appreciated that the system 500 may be incorporated in other types of devices including, without limitation, cameras, binoculars, office equipment, scientific instruments, and the like. The system 500 may include a pixelated display device 502, sometimes called an information display 502, backlight assembly 504, and an optical subsystem 506. A schematic representation of an eye 508 of a user is also illustrated. Such elements are aligned along an optical axis 510.

Backlight assembly 504, which emits light, may include a light source, such as one or more light emitting diodes (LEDs), one or more OLEDs, one or more cold cathode fluorescent lamps (CCFLs), one or more lasers, one or more quantum dots, or any combination of these example light sources. The light source in the backlight assembly 504 may emit light across a broad spectrum (e.g., white light) so that information display 502 can produce color images across the visible spectrum. Backlight assembly 504 may emit light uniformly across its entire front face over a range of about 160 to 180 degrees, for example.

Information display 502, in coordination with the backlight assembly 504, may emit light over a range of angles up to about 180 degrees (light that is just shy of parallel to the face of the backlight assembly 504). This range of emission angles is sometimes referred to as the backlight assembly's 504 field of view or the backlight assembly's 504 cone of light. In some embodiments, information display 502 may be an LCD matrix that includes one or more polarizing layers, a liquid crystal layer, and a thin film transistor layer. The LCD matrix creates images by obscuring portions of the backlight in a pixelated fashion. An image is displayed when light 512 is emitted from backlight assembly 504 and passes through information display 502 (e.g., an LCD matrix). For clarity, FIG. 5 shows separation between the backlight assembly 504 and information display 502. However, these two components may be sandwiched together with little, if any, space between them.

Optical subsystem 506 may comprise a lens assembly to direct light from information display 502 toward user's eye 508. Optical subsystem 506 may have a pancake configuration, for example. In this case, the optical subsystem 506 may comprise an assembly of optical elements configured to direct light from information display 502 toward user's eye 508 using on-axis optical folding based, at least in part, on polarization of the light, as described below. In some embodiments, the lens assembly of the optical subsystem 506 includes various optical elements other than a lens. For example, optical subsystem 506 may include at least one linear polarizer 538 and a spatially-varying retarder (SVR) 516. The linear polarizer 538 may be located between the SVR 516 and an exit surface 514 of the optical subsystem 506. The SVR 516 is configured to modify the phase of the light passing through the SVR 516 by amounts that are different for different portions of the SVR 516. For example, if the backlight/display emits light at varying angles, light emitted from the periphery of the display toward the user's eye may enter the optical subsystem 506 at a relatively large angle of incidence. SVR 516, if configured for varying degrees of phase modification across the SVR 516, may provide appropriate levels of retardation for light from any and all angles in order to mitigate undesirable visual effects (e.g., remove unwanted stray light from reaching the user's eye 508).

FIG. 5 illustrates an example ray path 518 of light of an image generated by information display 502. For simplicity, optical subsystem 506 is illustrated schematically as a block that includes at least one lens-shaped element. However, optical subsystem 506 may include any of a number of types of optical elements that need not be lenses. A particular example of an optical subsystem 506 is now described.

Optical subsystem 506 may include a linear polarizer 520 having a front face 522 and a back face 524. The linear polarizer 520 may be disposed on a quarter-wave plate 526 that has a front face adjacent to back face 524 of linear polarizer 520, and a back face 528. The quarter-wave plate 526 may be disposed on a lens doublet 530. In an example, the lens doublet 530 may comprise a plano-concave singlet having a planar face 532 and a concave surface 534. The curvature of the concave surface 534 may establish the focal length of the optical subsystem 506. A first reflective polarizing beam splitter, which may comprise an optical coating (e.g., metallic thin film or a multilayer dielectric film), may be located at (e.g., disposed on) the concave surface 534 of the lens doublet 530. The lens doublet 530 may be disposed on the SVR 516. The SVR 516 may be disposed on a second reflective polarizing beam splitter 536. The second reflective polarizing beam splitter 536 may be disposed on an optional second linear polarizer 538. It is to be appreciated that "disposed on" may mean disposed directly on, or disposed indirectly on (e.g., with one or more intermediary layers). In addition, it is to be appreciated that "disposed on" can mean "in contact with" or "adjacent to" such that there may be a space between a layer that is disposed on another layer.

To illustrate operating principles of optical subsystem 506, ray path 518 enters the optical subsystem 506 unpolarized at an entrance side (or surface) of the optical subsystem 506, and ray path 518 is polarized to one orientation, p for example, by linear polarizer 520. After passing through quarter-wave plate 526, the light is right-hand circularly polarized. After passing through the lens doublet 530 and subsequently through the SVR 516, the resulting s-polarized light reflects from the second reflective polarizing beam splitter 536, passes through the SVR 516 in the reverse direction, reflects again from the first reflective polarizing beam splitter at concave surface 534 of the lens doublet 530, and passes through SVR 516 for a third time to emerge from an exit side 514 (or surface) of the optical subsystem 506 as p-polarized light. Any stray s-polarized light may be removed by the optional second linear polarizer 538, so that pure p-polarized light reaches eye 508.

Figure 6:
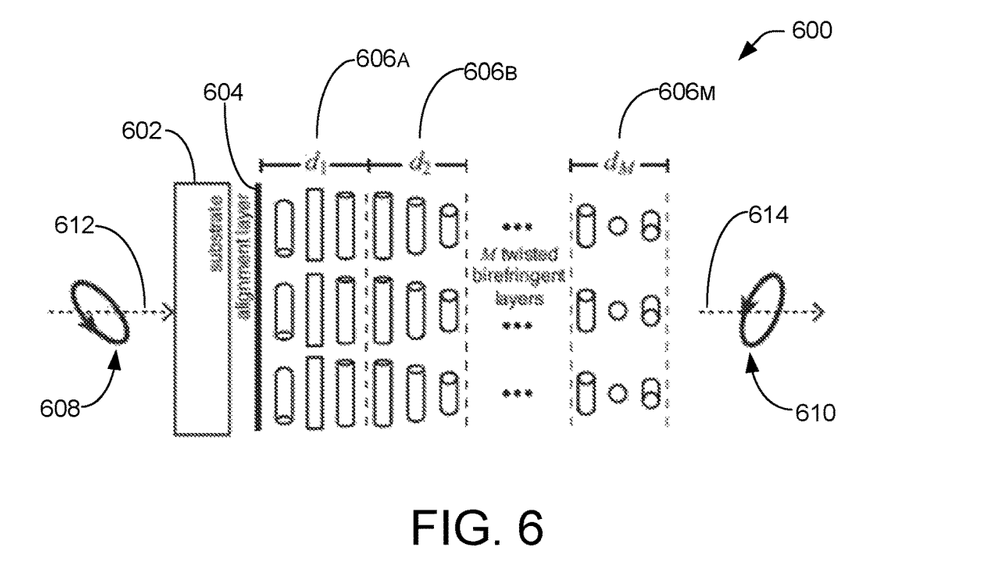
FIG. 6 is a schematic diagram of an example spatially-varying retarder (SVR), according to some embodiments.

FIG. 6 is a schematic diagram of an example spatially-varying retarder (SVR) 600, according to some embodiments. SVR 600 may be the same as or similar to SVR 316/416/516 illustrated in FIGS. 3/4/5, for example.

In some examples, SVR 600 may be a monolithic structure, with a substrate 602, alignment layer 604, and M twisted birefringent layers 606A, 606B, . . . 606M, of liquid crystal elements, where M is an integer that is 2 or more. Such layers may include polymerizable liquid crystals. Cylinders in FIG. 6 correspond to the optical axis (and the nematic director field). Subsequent twisted birefringent layers 606 are aligned by the prior twisted birefringent layer 606. Ellipses 608 and 610 schematically indicate polarization of entering light 612 and exiting light 614, respectively.

SVR 600 provides a number of benefits, such as effective control of broadband polarization transformation. Because a SVR 600 includes subsequent liquid crystal layers that are aligned directly by prior layers, fabrication of the SVR 600 is relatively simple, achieving automatic layer registration, and resulting in a monolithic film with a continuously varying optic axis. SVR 600 is generally well-suited for patterned achromatic retarders, and can achieve large bandwidth and/or low-variation of retardation within visible through infrared wavelengths. For example, SVR 600 may operate with relatively high achromaticity across bandwidths of 450-650 nanometers (nm) and 400-800 nm.

It is to be appreciated that the example SVR 600 shown in FIG. 6 is but one example type of SVR 416/516 that is suitable for implementation in the techniques and systems described herein. In some embodiments, an example SVR 416/516 can comprise one or more layers of birefringent material, such as a polymer, which acts as a mechanism to alter the polarization state of light passing through the SVR at amounts that are different for different portions of the SVR. In some embodiments, an example SVR 416/516 can comprise a thin film dichroic material (e.g., stack) that acts as the mechanism to alter the polarization state of light passing through the SVR at amounts that are different for different portions of the SVR. In some embodiments, an example SVR 416/516 can comprise substrate having nanofeatures that acts as the mechanism to alter the polarization state of light passing through the SVR at amounts that are different for different portions of the SVR. In any of these example configurations, the SVR 416/516 alters the polarization at different degrees/amounts as a function of position on the SVR 416/516 (e.g., altering the polarization state by a greater amount toward the periphery of the SVR 416/516, and altering the polarization state by a lesser amount towards the center of the SVR 416/516).

Figure 7:
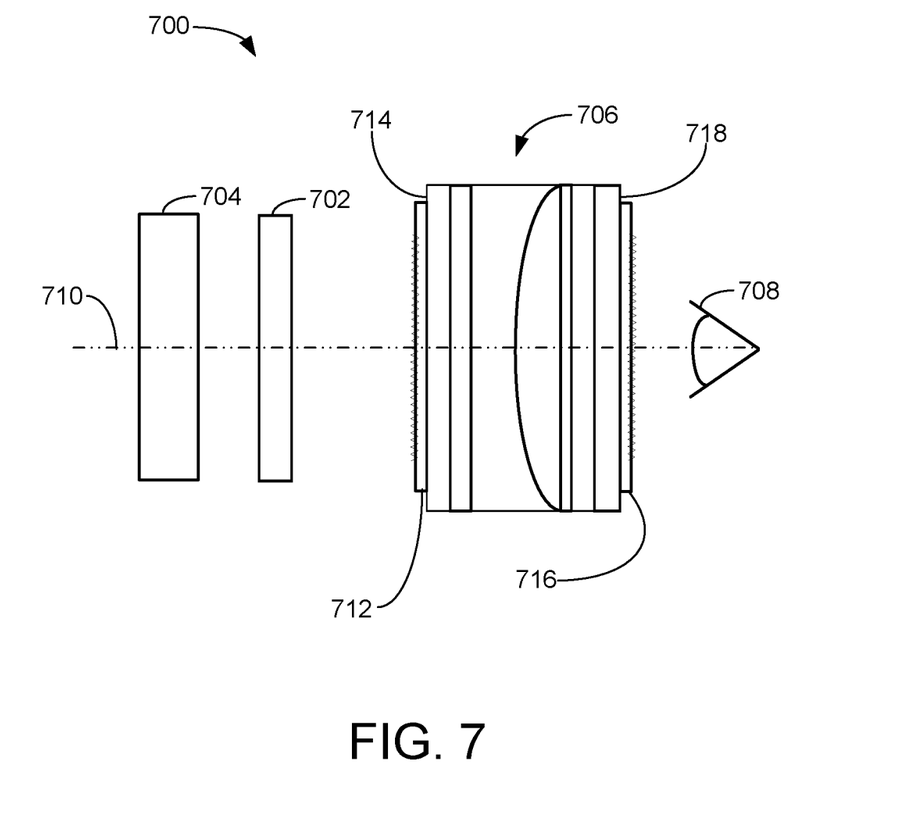
FIG. 7 is a schematic cross-section diagram of system that includes a display and optical subsystem including a spatially-varying retarder (SVR), according to some embodiments.

FIG. 7 is a schematic cross-section diagram of a system 700 that includes a display and optical subsystem, according to some embodiments. System 700 may be incorporated in head-mountable device, such as wearable device 104/204, for example. The system 700 may include an information display 702, backlight assembly 704, and an optical subsystem 706. A schematic representation of an eye 708 of a user is also illustrated. Such elements are aligned along an optical axis 710.

System 700 may be similar to system 500 illustrated in FIG. 5, with the addition of a Fresnel lens 712 disposed on an entrance side 714 (or surface) of optical subsystem 706 or a Fresnel lens 716 on an exit side 718 (or surface) of optical subsystem 706. For example, the Fresnel lens 712 may be disposed on a front face 422 of the first quarter-wave plate 426, as described with reference to FIG. 4, or on a front face 522 of the linear polarizer 520, as described with reference to FIG. 5. Alternatively, the polarizing beam splitter 338, the second reflective polarizing beam splitter 536 or, the linear polarizer 438/538—as described with reference to FIGS. 3/4/5—may be disposed on the Fresnel lens 716. FIG. 7 shows both Fresnel lenses 716 and 718 as part of the optical subsystem 706, although it is to be appreciated that the optical subsystem 706 may include the Fresnel lens 712 without the Fresnel lens 716, or the optical subsystem 706 may include the Fresnel lens 716 without the Fresnel lens 712. Such an addition of a Fresnel lens (712 or 716) to the optical subsystem 706 may be used to modify the focal length of light exiting optical subsystem 706. Other types of lenses may additionally or alternately be used on side 714 and/or side 718 of the optical subsystem 706

Figure 8:
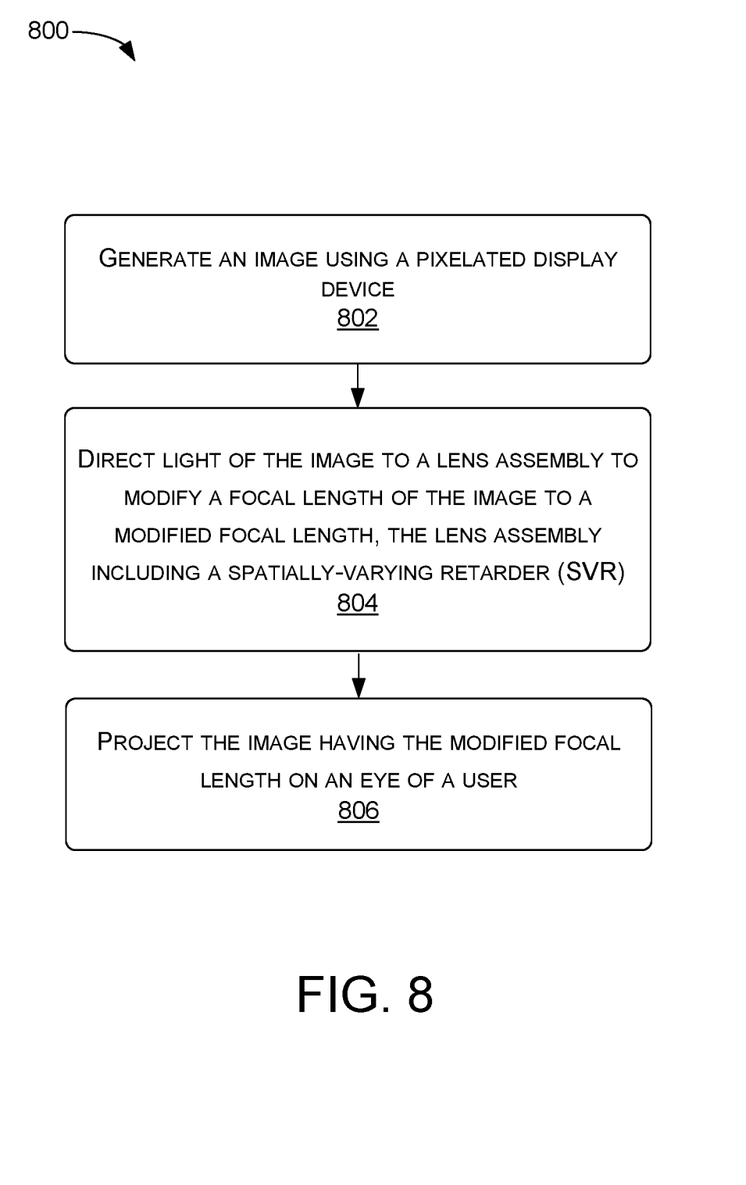
FIG. 8 is a flow diagram illustrating a process for providing a focused image to an eye of a user of display device, according to some example embodiments.

FIG. 8 is a flow diagram illustrating a process 800 for providing a focused image to an eye of a user of display device, according to some example embodiments. For example, such a display device may be included in an HMD that is the same as or similar to wearable device 104. In block 802, the display device may generate an image using a pixelated display device, such as an LCD display, for example. Such generation may be in cooperation with an illuminating backlight, for instance. At block 804, the display device may direct light of the image to a lens assembly, such as the optical subsystem 506, to modify a focal length of the image to a modified focal length. For example, the lens assembly may include a spatially-varying retarder (SVR) 316/416/516/600 that is configured to modify the phase of the light passing through the SVR 316/416/516/600 by amounts that are different for different portions of the SVR 316/416/516/600. At block 806, the display device may project the image having the modified focal length onto the eye of the user.

Many variations and modifications may be made to the above-described examples, the elements of which are to be understood as being among other acceptable examples. All such modifications and variations are intended to be included herein within the scope of this disclosure.

What is claimed is:

1. A system comprising:
   an information display; and
   a lens assembly to direct light from the information display toward a user's eye, wherein the lens assembly includes:
   an entrance side where the light enters the lens assembly;
   an exit side where the light exits the lens assembly;
   a spatially-varying retarder (SVR) to modify phase of the light that passes through the SVR by amounts that are different for different portions of the SVR; and
   at least one of a polarizing beam splitter or a partially reflective mirror disposed between the SVR and the exit side of the lens assembly.

2. The system of claim 1, wherein the SVR comprises one or more layers of birefringent material.

3. The system of claim 2, wherein the one or more layers of birefringent material comprise a plurality of twisted birefringent layers of liquid crystal elements.

4. The system of claim 1, wherein the system is incorporated into a head-mountable device.

5. The system of claim 1, wherein the SVR is part of a quarter-wave plate.

6. The system of claim 1, wherein the lens assembly further includes:
a first quarter-wave plate;
a second quarter-wave plate; and
a lens interposed between the first quarter-wave plate and the second quarter-wave plate,
wherein the SVR is part of at least one of the first quarter-wave plate or the second quarter-wave plate.

7. The system of claim 6, wherein:
the first quarter-wave plate is disposed on the information display
the second quarter-wave plate is disposed on the polarizing beam splitter or the partially reflective mirror; and
the SVR is part of the second quarter-wave plate.

8. The system of claim 7, wherein the SVR is a first SVR, and wherein the lens assembly further includes a second SVR that is part of the first quarter-wave plate.

9. A method comprising:
generating an image using a pixelated display device;
directing light of the image to a lens assembly to modify a focal length of the image to a modified focal length, the lens assembly including:
a spatially-varying retarder (SVR) that is configured to modify phase of the light that passes through the SVR by amounts that are different for different portions of the SVR; and
at least one of a polarizing beam splitter, a partially reflective mirror, or a linear polarizer disposed between the SVR and an exit side of the lens assembly; and
projecting the image having the modified focal length on an eye of a user.

10. The method of claim 9, wherein the SVR comprises a plurality of birefringent layers of polymerizable liquid crystals.

11. The method of claim 9, wherein the SVR is part of a quarter-wave plate.

12. The method of claim 9, wherein the lens assembly further includes:
a first quarter-wave plate;
a second quarter-wave plate; and
a beam splitter interposed between the first quarter-wave plate and the second quarter-wave plate,
wherein the SVR is part of at least one of the first quarter-wave plate or the second quarter-wave plate.

13. The method of claim 11, wherein the SVR is a first SVR and the quarter-wave plate comprises a first quarter-wave plate, and wherein the lens assembly further includes a second SVR that is part of a second quarter-wave plate.

14. The method of claim 9, wherein the pixelated display device and the lens assembly are in a head-mounted display.

15. The method of claim 9, wherein the lens assembly is configured to direct light from the pixelated display device toward the eye of the user using on-axis optical folding based, at least in part, on polarization of the light.

16. A system comprising:
an information display that includes pixels that are configured to collectively form an image;
a backlighting assembly to illuminate the pixels of the information display; and
an optical subsystem to direct light of the image from the information display toward a user's eye, wherein the optical subsystem includes:
a spatially-varying retarder (SVR) that is configured to modify phase of the light to a modified phase as the light passes through the SVR, wherein the phase of the light is modified by amounts that are different for different portions of the SVR; and
at least one of a polarizing beam splitter, a partially reflective mirror, or a linear polarizer positioned to receive the light having the modified phase after the light has passed through the SVR and to selectively allow the light to pass through and exit from an exit surface of the optical subsystem toward the user's eye.

17. The system of claim 16, wherein the SVR comprises one or more layers of birefringent material, the one or more layers of birefringent material including polymerizable liquid crystals.

18. The system of claim 16, wherein the SVR is part of a quarter-wave plate.

19. The system of claim 16, wherein the optical subsystem further includes:
a first quarter-wave plate;
a second quarter-wave plate; and
a lens interposed between the first quarter-wave plate and the second quarter-wave plate,
wherein the SVR is part of at least one of the first quarter-wave plate or the second quarter-wave plate.

20. The system of claim 19, wherein:
the optical subsystem includes the polarizing beam splitter;
the first quarter-wave plate is disposed on the information display;
the second quarter-wave plate is disposed on the polarizing beam splitter; and
the SVR is part of the first quarter-wave plate.

* * * * *